United States Patent
Sugitani et al.

(10) Patent No.: US 8,304,135 B2
(45) Date of Patent: Nov. 6, 2012

(54) PROTON-CONDUCTIVE POLYMER ELECTROLYTE MEMBRANE, METHOD OF MANUFACTURING THE PROTON-CONDUCTIVE POLYMER ELECTROLYTE MEMBRANE, AND MEMBRANE-ELECTRODE ASSEMBLY AND POLYMER ELECTROLYTE FUEL CELL USING THE PROTON-CONDUCTIVE POLYMER ELECTROLYTE MEMBRANE

(75) Inventors: Tooru Sugitani, Osaka (JP); Hiroyuki Nishii, Osaka (JP); Otoo Yamada, Osaka (JP); Sakura Toshikawa, Osaka (JP)

(73) Assignee: Nitto Denko Corporation, Osaka (JP)

(*) Notice: Subject to any disclaimer, the term of this patent is extended or adjusted under 35 U.S.C. 154(b) by 239 days.

(21) Appl. No.: 12/936,658

(22) PCT Filed: Mar. 3, 2009

(86) PCT No.: PCT/JP2009/053989
§ 371 (c)(1),
(2), (4) Date: Oct. 6, 2010

(87) PCT Pub. No.: WO2009/125636
PCT Pub. Date: Oct. 15, 2009

(65) Prior Publication Data
US 2011/0027692 A1    Feb. 3, 2011

(30) Foreign Application Priority Data
Apr. 11, 2008 (JP) .................. 2008-103304

(51) Int. Cl.
*H01M 8/10* (2006.01)
(52) U.S. Cl. ........ 429/493; 429/465; 429/477; 429/481; 429/483; 429/491; 429/492
(58) Field of Classification Search .................. 429/465, 429/477, 479, 481, 483, 491–494
See application file for complete search history.

(56) References Cited

U.S. PATENT DOCUMENTS
5,409,785 A    4/1995   Nakano et al.
(Continued)

FOREIGN PATENT DOCUMENTS
JP    6-76838    3/1994
(Continued)

OTHER PUBLICATIONS

Qiao, et al., "Life test of DMFC using poly(ethylene glycol)bis(carboxymethyl)ether plasticized PVA/PAMPS proton-conducting semi-IPNs", Electrochemistry Communications, vol. 9, 2007, pp. 1945-1950.
(Continued)

*Primary Examiner* — Patrick Ryan
*Assistant Examiner* — Ben Lewis
(74) *Attorney, Agent, or Firm* — Hamre, Schumann, Mueller & Larson, P.C.

(57) ABSTRACT

A method of manufacturing a proton-conductive polymer electrolyte membrane using polyvinyl alcohol (PVA) as a base material and having excellent proton conductivity and methanol blocking properties is provided. The method includes: heat-treating a precursor membrane including PVA and a water-soluble polymer electrolyte having a proton conductive group to proceed crystallization of the PVA; and chemically crosslinking the heat-treated precursor membrane with a crosslinking agent reactive with the PVA, to form a polymer electrolyte membrane in which a crosslinked PVA is a base material and protons are conducted through the electrolyte retained in the base material. The content of a water-soluble polymer except the PVA and the water-soluble polymer electrolyte in the precursor membrane is in a weight ratio of less than 0.1 with respect to the PVA.

12 Claims, 3 Drawing Sheets

U.S. PATENT DOCUMENTS

| | | |
|---|---|---|
| 5,438,082 A | 8/1995 | Helmer-Metzmann et al. |
| 6,087,031 A | 7/2000 | Iwasaki et al. |
| 6,245,881 B1 | 6/2001 | Faure et al. |
| 6,523,699 B1 * | 2/2003 | Akita et al. ............ 210/490 |
| 2008/0070086 A1 | 3/2008 | Fukuchi et al. |

FOREIGN PATENT DOCUMENTS

| | | |
|---|---|---|
| JP | 6-93114 | 4/1994 |
| JP | 9-245818 | 9/1997 |
| JP | 10-45913 | 2/1998 |
| JP | 2000-510511 | 8/2000 |
| JP | 2005-154710 | 6/2005 |
| JP | 2006-156041 | 6/2006 |
| JP | 2007-273203 | 10/2007 |
| WO | 2006/073146 | 7/2006 |

OTHER PUBLICATIONS

Wu, et al., "A methanol barrier polymer electrolyte membrane in direct methanol fuel cells", Journal of New Materials for Electrochemical Systems, vol. 5, 2002, pp. 251-254.

* cited by examiner

PROTON-CONDUCTIVE POLYMER ELECTROLYTE MEMBRANE, METHOD OF MANUFACTURING THE PROTON-CONDUCTIVE POLYMER ELECTROLYTE MEMBRANE, AND MEMBRANE-ELECTRODE ASSEMBLY AND POLYMER ELECTROLYTE FUEL CELL USING THE PROTON-CONDUCTIVE POLYMER ELECTROLYTE MEMBRANE

TECHNICAL FIELD

The present invention relates to a proton-conductive polymer electrolyte membrane and a method of manufacturing the membrane. The invention also relates to a membrane-electrode assembly and a polymer electrolyte fuel cell using the proton-conductive polymer electrolyte membrane.

BACKGROUND ART

In recent years, fuel cells have been attracting attention as a next generation energy source. In particular, polymer electrolyte fuel cells (PEFCs), which use a proton-conductive polymer membrane as the electrolyte, have high energy density and are expected to find a wide range of applications, such as in home cogeneration system, power sources for mobile devices, and power sources for automobiles. The electrolyte membrane of a PEFC needs to function as an electrolyte for conducting protons between the fuel electrode and the oxidant electrode and to serve as a partition wall for separating a fuel supplied to the fuel electrode and an oxidizing agent supplied to the oxidant electrode. If one of the functions as the electrolyte and the partition wall is insufficient, the power generation efficiency of the fuel cell degrades. For this reason, a polymer electrolyte membrane is desired that is excellent in proton conductivity, electrochemical stability, and mechanical strength and has low permeability of fuel and oxidizing agent.

Currently, perfluorocarbon sulfonic acid having a sulfonic acid group as the proton conductive group (for example, Nafion (registered trademark) made by DuPont Corp.) is widely used for the electrolyte membrane of the PEFC. Although the perfluorocarbon sulfonic acid membrane shows excellent electrochemical stability, it is very costly because the fluororesin that is a source material is not a general-purpose product and also the process of synthesis is complicated. A high-cost electrolyte membrane can be a great barrier to commercialization of the PEFC. Moreover, the perfluorocarbon sulfonic acid membrane easily permeates methanol (i.e., it is poor in methanol blocking properties), therefore, it is difficult to use the perfluorocarbon sulfonic acid membrane as the electrolyte membrane of a direct methanol fuel cell (DMFC), one type of the PEFC, in which a methanol-containing solution is supplied to the fuel electrode.

For these reasons, development of a hydrocarbon polymer electrolyte membrane that is low in cost and inhibits the methanol permeation (cross-over) has been underway as a replacement of the perfluorocarbon sulfonic acid membrane. For example, JP 6(1994)-93114 A, JP 10(1998)-45913 A, JP 9 (1997)-245818 A, and JP 2000-510511 T (Published Japanese translation of PCT application) propose electrolyte membranes made of sulfonated poly(ether ether ketone), sulfonated poly(ether sulfone), sulfonated polysulfone, and sulfonated polyimide, respectively. The resins used as the source materials of these hydrocarbon electrolyte membranes are lower in cost than fluororesin, so the use of the above electrolyte membranes is claimed to achieve cost reduction of the PEFC. However, the characteristics of the hydrocarbon electrolyte membranes proposed in the just-mentioned publications are not necessarily sufficient for the electrolyte membrane for a fuel cell, which is required to have both functions of an electrolyte and a partition wall, and commercialization of a PEFC using the membranes has yet not been accomplished.

Apart from them, JP 2006-156041 A discloses an electrolyte membrane made of a blend of a water-soluble polymer electrolyte having an acid group, which is a proton conductive group, polyvinyl alcohol (PVA), and a water-soluble polymer such as polyethylene glycol (PEG), which is a third component (see claim 1). It also discloses that the membrane may be physically or chemically crosslinked (see claim 4, paragraph [0006], and the examples). The use of PVA as the base material allows this electrolyte membrane to be manufactured at low cost. However, the proton conductivity of the electrolyte membrane disclosed in JP 2006-156041 A is significantly poorer than that of the perfluorocarbon sulfonic acid membrane. It is impracticable to use the just-mentioned electrolyte membrane as the electrolyte membrane of the PEFC, especially the electrolyte membrane of the DMFC in which a methanol-containing solution is supplied to the fuel electrode.

DISCLOSURE OF THE INVENTION

It is an object of the present invention to provide a proton-conductive polymer electrolyte membrane that uses PVA as a base material and has excellent proton conductivity and methanol blocking properties, and to provide a method of manufacturing the electrolyte membrane.

A method of manufacturing a proton-conductive polymer electrolyte membrane according to the present invention includes: heat-treating a precursor membrane including PVA and a water-soluble polymer electrolyte having a proton conductive group to proceed crystallization of the PVA; and chemically crosslinking the heat-treated precursor membrane with a crosslinking agent reactive with the PVA, to form a polymer electrolyte membrane in which a crosslinked PVA is a base material and protons are conducted through the electrolyte retained in the base material. The content of a water-soluble polymer except the PVA and the water-soluble polymer electrolyte in the precursor membrane is in a weight ratio of less than 0.1 with respect to the PVA.

A proton-conductive polymer electrolyte membrane of the present invention is an electrolyte membrane obtained by the foregoing manufacturing method of the present invention.

In another aspect, the present invention provides a proton-conductive polymer electrolyte membrane including: a base material including a crosslinked PVA, and a proton-conductive water-soluble polymer electrolyte retained in the base material. The content of a water-soluble polymer except the PVA and the water-soluble polymer electrolyte is in a weight ratio of less than 0.1 with respect to the PVA.

A membrane-electrode assembly of the present invention includes: a polymer electrolyte membrane, and a pair of electrodes disposed so as to sandwich the electrolyte membrane. The electrolyte membrane is the foregoing proton-conductive polymer electrolyte membrane of the present invention.

A polymer electrolyte fuel cell of the present invention includes: a polymer electrolyte membrane, and a pair of separators disposed so as to sandwich the electrolyte membrane. The electrolyte membrane is the foregoing proton-conductive polymer electrolyte membrane of the present invention.

The manufacturing method of the present invention makes it possible to manufacture an electrolyte membrane having improved proton conductivity and methanol blocking properties. It is also possible to manufacture an electrolyte membrane that has proton conductivity as high as that of the electrolyte membrane made of a perfluorocarbon sulfonic acid such as Nafion and significantly improved methanol blocking properties over the just-mentioned electrolyte membrane made of the perfluorocarbon sulfonic acid.

PVA is basically water-soluble. Therefore, when it is used as an electrolyte membrane, it is necessary to improve its water resistance. According to JP 2006-156041 A, an improvement of the water resistance of PVA and the use of PVA as a base material are attempted by adding a water-soluble polymer (a third component) such as PEG, which has the function of "imparting mechanical strength to the membrane through hydrogen bonding with PVA" (see paragraph 0017), and further physically or chemically crosslinking the PVA. However, the present inventors have found that, in this electrolyte membrane, the third component that is added in a weight ratio of "1:0.1-2.0" with respect to PVA (see paragraph 0017) inhibits crystallization of the PVA, so the water resistance of the PVA after crosslinking does not improve sufficiently, consequently degrading the proton conductivity and methanol blocking properties of the membrane.

On the other hand, in the manufacturing method of the present invention, the content of the water-soluble polymer in the precursor membrane is set at a weight ratio of less than 0.1 with respect to the PVA, and for this precursor membrane, a heat treatment step (I) and a crosslinking step (II) are conducted in that order. With this method, the crystallinity of the PVA is enhanced reliably, and the water resistance of the PVA is improved sufficiently by chemical crosslinking. As a result, an electrolyte membrane that has excellent proton conductivity and methanol blocking properties is obtained. When the order of the heat treatment step (I) and the crosslinking step (II) is reversed as described in an example shown below, it is impossible to obtain an electrolyte membrane with good characteristics. The reason is believed to be that, because the crosslinking of the PVA proceeds in advance, the crystallization of the PVA by the subsequent heat treatment becomes difficult.

BEST MODE FOR CARRYING OUT THE INVENTION

Figure 1:
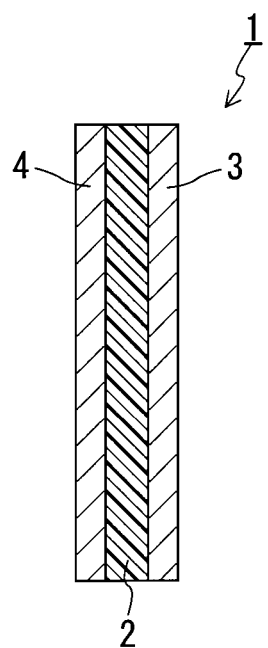
FIG. 1 is a schematic view illustrating one example of a membrane-electrode assembly according to the present invention.

Manufacturing Method of Proton-Conductive Polymer Electrolyte Membrane

[Precursor Membrane]

A precursor membrane used in the manufacturing method of the present invention contains PVA and a water-soluble polymer electrolyte having a proton conductive group. In the precursor membrane, the content of a water-soluble polymer except the PVA and the water-soluble polymer electrolyte is in a weight ratio of less than 0.1 with respect to the PVA. A heat treatment and a subsequent chemical crosslinking allow the precursor membrane to be a proton-conductive polymer electrolyte membrane in which a crosslinked PVA is a base material and the water-soluble polymer electrolyte is contained in the base material.

The precursor membrane may be substantially free of the water-soluble polymer. In the manufacturing method of the present invention, the electrolyte membrane can be formed without containing the water-soluble polymer in the precursor membrane. That is, the precursor membrane is substantially free of the water-soluble polymer, or even if it contains the water soluble polymer, the content of the water-soluble polymer is in a weight ratio of less than 0.1 with respect to the PVA. The phrase "substantially free" means that it may contain a trace amount (for example, in a weight ratio less than 0.01 with respect to PVA) of water-soluble polymer, such as impurities that are present in the materials used in forming the precursor membrane.

The molecular weight of the PVA is not particularly limited; however, by using a PVA having a viscosity-average molecular weight of from 10,000 to 1,000,000, it is possible to form a base material suitable for an electrolyte membrane. Taking the mechanical properties, such as mechanical strength, of the electrolyte membrane into consideration, it is preferable that the viscosity-average molecular weight of the PVA be from 50,000 to 200,000.

The type of the water-soluble polymer electrolyte is not particularly limited as long as it has a proton conductive group.

The proton conductive group may be a sulfonic acid group or a phosphoric acid group, for example. A sulfonic acid group is preferable because high proton conductivity is obtained even when the content thereof in the electrolyte membrane is low. The sulfonic acid group and the phosphoric acid group include a group that is in a state of a salt, such as sodium salt and ammonium salt (for example, a sodium sulfonate group). However, if the sulfonic acid group or the phosphoric acid group is in a state of a salt, it is preferable that the group be changed into a proton type by a later-described acid treatment step before an electrolyte membrane is finally formed.

The water-soluble polymer electrolyte may be at least one selected from the group consisting of polystyrene sulfonic acid (PSS), polyvinyl sulfonic acid, poly(2-acrylamide-2-methylpropanesulfonic acid), sulfonated poly(ether ether ketone) and sulfonated poly(ether sulfone). These electrolytes have a sulfonic acid group as the proton conductive group. The water-soluble polymer electrolyte may be a sulfonated polyarylene resin other than the sulfonated poly(ether ether ketone) and the sulfonated poly(ether sulfone).

The content of the water-soluble polymer electrolyte in the precursor membrane may be, but not particularly limited to, in a weight ratio with respect to PVA (the weight of the water-soluble polymer electrolyte/the weight of the PVA) of from 0.05 to 1. If the weight ratio is too large, the proton conductivity of the electrolyte membrane will be improved because the content of the water-soluble polymer electrolyte relative to the PVA base material becomes high; however, the mechanical properties and methanol blocking properties will degrade, so the resulting electrolyte membrane will not be suitable for use in PEFC (particularly for use in DMFC). On the other hand, if the weight ratio is too small, sufficient proton conductivity for an electrolyte membrane is not obtained. The foregoing range of the weight ratio, expressed as the ratio "PVA:water-soluble polymer electrolyte", corresponds to from 95:5 to 50:50.

It is preferable that the weight ratio be from 0.18 to 0.54, more preferably from 0.25 to 0.54. In these ranges, an electrolyte membrane that has a desirable balance between proton conductivity and methanol blocking properties can be obtained. These ranges of the weight ratio, expressed as the ratio "PVA water-soluble polymer electrolyte", corresponds to from 85:15 to 65:35, and from 80:20 to 65:35, respectively.

The precursor membrane may be formed by, for example, casting a mixed solution of a PVA aqueous solution and an aqueous solution of the water-soluble polymer electrolyte on a substrate.

The concentration of the mixed solution (cast solution) is generally, but is not particularly limited to, from 1 weight % to 50 weight %, preferably about 3 weight % to about 20 weight %, taking the uniformity of the resulting precursor membrane into consideration.

For the casting of the mixed solution, it is possible to use a substrate made of glass, fluororesin such as polytetrafluoroethylene, or an engineering plastics such as polyimide.

The cast thickness is, for example, from about 10 μm to about 2,000 μm, and it can be adjusted according to the desired thickness of the electrolyte membrane to be obtained. If the cast thickness is too small, the mechanical strength of the electrolyte membrane lowers. On the other hand, if the cast thickness is too large, uniform drying is difficult to perform, so a membrane with a non-uniform structure tends to be formed easily.

It is preferable that the thickness of the electrolyte membrane be from 10 μm to 200 μm when used for a common PEFC, although it may depend on the application. The thickness is preferably from 20 μm to 100 μm, taking the balance between mechanical strength and proton conductivity into consideration. It the thickness of the electrolyte membrane is too small, the proton conductivity improves but the mechanical strength and methanol blocking properties degrade even more, decreasing the practical utility as an electrolyte membrane. On the other hand, if the thickness is too large, the mechanical strength and methanol blocking properties improve but the proton conductivity degrades, making it difficult to use the electrolyte membrane for PEFC.

Other details of the formation of the precursor membrane by casting may be according to known methods.

Both the PVA and the water-soluble polymer electrolyte are water-soluble, thus, the precursor membrane can be formed using water as a medium. This allows the environmental load in fabrication to be reduced.

[(I) Heat Treatment Step]

Although the heat treatment temperature is not particularly limited as long as it is less than a temperature at which the precursor membrane melts or decomposes, it is generally 100° C. to 180° C., in which the crystallization of PVA proceeds, preferably from 120° C. to 140° C., in which the crystallization of PVA proceeds most. If the heat treatment temperature is too low, the crystallization of PVA does not proceed sufficiently, making it impossible to obtain an electrolyte membrane with excellent proton conductivity and methanol blocking properties. On the other hand, if the heat treatment temperature is too high, the PVA deteriorates.

The duration of the heat treatment is from about several minutes to about 1 hour since the PVA crystallizes relatively quickly, although it may depend on the heat treatment temperature.

The heat treatment may be performed under the air atmosphere. It may be performed with adding pressure as necessary.

Other details of the heat treatment of the precursor membrane may be according to known methods.

[(II) Crosslinking Step]

The crosslinking agent may be a multifunctional crosslinking agent having two or more functional groups reactive with PVA (typically functional groups reactive with a hydroxy group of PVA). Examples of such a crosslinking agent include glutaraldehyde, terephthalaldehyde, and suberoyl chloride.

Details of the crosslinking step may be according to known methods. For example, the crosslinking step may be performed by immersing the precursor membrane in a crosslinking solution obtained by dissolving the crosslinking agent in an appropriate solvent.

The concentration of the crosslinking solution and the crosslinking time may be set as appropriate according to the composition of the precursor membrane and the type of the crosslinking agent. For example, the concentration of the crosslinking solution may be from 1 weight % to 20 weight %, and the crosslinking time may be from 0.1 hours to 48 hours.

In the manufacturing method of the present invention, it is possible to perform any step other than the heat treatment step and the crosslinking step as necessary. For example, when a water-soluble polymer electrolyte is used in which the proton conductive group is a sulfonic acid group in a state of a salt, such as sodium salt or ammonium salt, an acid treatment step may be performed for changing the proton conductive group into a proton type. Details of the acid treatment step are not particularly limited. For example, the acid treatment step may be performed by immersing the precursor membrane that has undergone the crosslinking step in a hydrochloric acid aqueous solution or a sulfuric acid aqueous solution with a concentration of about 0.5 N to 2 N for about 1 hour to 24 hours.

(Proton-Conductive Polymer Electrolyte Membrane)

The electrolyte membrane of the present invention is an electrolyte membrane obtained by the foregoing manufacturing method of the present invention.

When focusing on the fact that the content of the water-soluble polymer in the precursor membrane is in a weight ratio of less than 0.1 with respect to the PVA in the manufacturing method of the present invention, the electrolyte membrane of the present invention is, in other words, an electrolyte membrane including: a base material made of a crosslinked PVA; and a proton-conductive water-soluble polymer electrolyte retained in the base material. The content of the water-soluble polymer is in a weight ratio of less than 0.1 with respect to the PVA.

The electrolyte membrane of the present invention may be substantially free of the water-soluble polymer.

The water-soluble polymer electrolyte in the electrolyte membrane of the present invention has, for example, a proton type sulfonic acid group or a proton type phosphoric acid group as the proton conductive group.

The content of the water-soluble polymer electrolyte in the electrolyte membrane of the present invention is generally in a weight ratio of from 0.05 to 1, preferably from 0.18 to 0.54, and more preferably from 0.25 to 0.54, with respect to the PVA.

Although the electrolyte membrane of the present invention uses PVA as the base material, it shows excellent proton conductivity and methanol blocking properties. Depending of the configuration, the electrolyte membrane may have proton conductivity as high as that of the electrolyte membrane made of a perfluorocarbon sulfonic acid such as Nafion, and significantly improved methanol blocking properties over the electrolyte membrane made of the perfluorocarbon sulfonic acid.

Although the applications of the electrolyte membrane of the present invention are not particularly limited, it is suitable for application as the polymer electrolyte membrane (PEM) for PEFC, particularly suitable for application as the PEM for DMFC, which use a methanol-containing solution as the fuel.

(Membrane-Electrode Assembly)

FIG. 1 shows one example of the membrane-electrode assembly (MEA) according to the present invention.

The MEA 1 shown in FIG. 1 has an electrolyte membrane 2 and a pair of electrodes (an anode electrode 3 and a cathode electrode 4) disposed so as to sandwich the electrolyte membrane 2, and the electrolyte membrane 2 and the electrodes 3, 4 are joined to each other. The electrolyte membrane 2 is the above-described electrolyte membrane of the present invention. An incorporation of the MEA 1 into a PEFC allows the PEFC to improve the power generation characteristics of the PEFC, particularly when constructing a DMFC using a methanol-containing solution as the fuel.

The anode electrode 3 (fuel electrode) and the cathode electrode 4 (oxidant electrode) may have the same configurations as those used for common MEAs.

The MEA 1 may be formed by a known technique, for example, by hot pressing the electrolyte membrane 2 and the electrodes 3 and 4.

(Polymer Electrolyte Fuel Cell)

Figure 2:
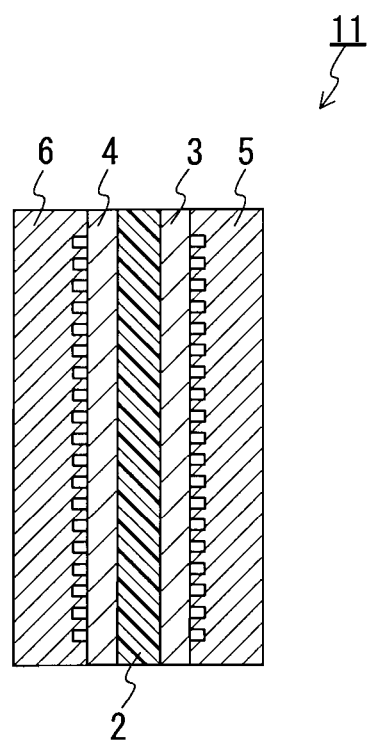
FIG. 2 is a schematic view illustrating one example of a fuel cell according to the present invention.

FIG. 2 shows one example of the polymer electrolyte fuel cell (PEFC) of the present invention.

A fuel cell 11 shown in FIG. 2 has an electrolyte membrane 2, a pair of electrodes (an anode electrode 3 and a cathode electrode 4) disposed so as to sandwich the electrolyte membrane 2, a pair of separators (an anode separator 5 and a cathode separator 6) disposed so as to sandwich the pair of electrodes. These members are joined in a state in which pressure is applied in a direction perpendicular to the main surface of each of the members. The electrolyte membrane 2 and the electrodes 3 and 4 constitute an MEA 1. Here, the electrolyte membrane 2 is the above-described electrolyte membrane of the present invention, and it is capable of constructing the fuel cell 11 that shows excellent power generation characteristics (particularly excellent power generation characteristics when constructing a DMFC which uses a methanol-containing solution as the fuel).

The anode electrode 3 (fuel electrode), the cathode electrode 4 (oxidant electrode), the anode separator 5, and the cathode separator 6 may have the same configurations as those used for common PEFCs.

The fuel cell of the present invention may be provided with other components than the components shown in FIG. 2 as needed. Although the PEFC 11 shown in FIG. 2 is what is called a single cell, the fuel cell of the present invention may be a stack in which a plurality of such single cells are stacked.

EXAMPLES

The present invention will be described in more detail with reference to the examples set forth below. The invention is not limited by the following examples.

First, the evaluation method for the electrolyte membranes produced in the present examples will be described.

(Ion Exchange Capacity: IEC)

A produced electrolyte membrane was immersed in a sodium chloride aqueous solution with a concentration of 3 mole/L, and the temperature of the aqueous solution was elevated to 60° C. and kept for 3 hours by a water bath. Next, the aqueous solution was cooled to room temperature, and thereafter the electrolyte membrane was taken out from the aqueous solution and sufficiently washed with ion exchanged water. The ion exchanged water used for the washing was added to the aqueous solution after the electrolyte membrane was removed. Next, the amount of protons (hydrogen ions) contained in the aqueous solution after removing the electrolyte membrane was determined by titrating a sodium hydroxide aqueous solution with a concentration of 0.05 N using an automatic potentiometric titration device (AT-510 made by Kyoto Electronics Manufacturing Co., Ltd.). From the obtained amount of protons and the weight of the electrolyte membrane that had been measured in advance of immersing it in the sodium chloride aqueous solution, the ion exchange capacity (meq/g) of the produced electrolyte membrane was determined.

The greater the ion exchange capacity of the electrolyte membrane is, the more proton conductive groups the electrolyte membrane has.

(Proton Conductivity: $\sigma$)

The produced electrolyte membrane was immersed in ion exchanged water at 25° C. and kept for 1 hour or longer, and thereafter, the electrolyte membrane swelled by the immersing was sandwiched by a pair of platinum foil (in a rectangular shape) to form a sample for evaluating the proton conductivity. When sandwiching the electrolyte membrane by the platinum foils, the pair of platinum foil were disposed so that their longer sides were brought to be closer to each other in parallel, and viewed from the direction perpendicular to the plane of the electrolyte membrane, the just-mentioned sides were spaced at 10 mm from each other. The distance of the spacing was defined as the electrode distance d (=1 cm) in the sample. Next, using the pair of platinum foil as the measurement electrodes, the complex impedance measurement (measurement frequency: 10 kHz to 1 MHz) was conducted for the sample, with the use of an LCR meter (LCR meter 3532-80 made by Hioki E. E. Corp.). Next, the real part of the impedance obtained by the measurement was plotted along the horizontal axis, and the imaginary part there of was plotted along the vertical axis, and the real part of the minimal value was taken as the membrane resistance R ($\Omega$) of the sample. Apart from this, the thickness t1 ($\mu$m) of the electrolyte membrane swelled by the immersing was measured, and the proton conductivity $\sigma$ (S/cm) of the sample was determined by the following equation (1).

$$\sigma(S/cm) = (1 \times 10^{-4})/(R \times t1 \times h) \quad (1)$$

In the equation (1), h represents the length (cm) of the longer sides of the platinum foil that sandwich the electrolyte membrane.

(Methanol Cross-Over: MCO)

Using the produced electrolyte membrane as a partition wall, a pair of glass containers having the same shape are joined at their openings. Next, a methanol aqueous solution (temperature: 60° C.) with a concentration of 3 mole/L was poured into one of the glass containers from another opening of the container, and distilled water (temperature: 60° C.) was poured into the other one of the glass containers from another opening of the container. Thereafter, the amount of the methanol permeated through the electrolyte membrane to the distilled water side was quantified every certain time while the entire containers were kept at 60° C. by a water bath. The quantification of the methanol was performed by gas chromatography (GC), and a calibration curve created from the GC measurement for a methanol aqueous solution having a predetermined concentration was used for the quantification. The quantified methanol amounts were plotted against elapsed time, and from the slope of the plots, the methanol cross-over (mmol/hr/cm) of the electrolyte membrane was determined using the following equation (2).

$$\text{Methanol cross-over} = \text{Slope of the plots (mmol/hr)}/S \times t2 \quad (2)$$

In the equation (2), S and t2 represent the area of the partition wall portion in the electrolyte membrane and the thickness of the swelled electrolyte membrane that is measured immediately after the evaluation of the MCO, respectively.

Example 1

An aqueous solution of PVA (degree of polymerization: 3,500) with a concentration of 5 weight % and an aqueous solution of sodium polystyrene sulfonate (PSSNa, weight-average molecular weight of 1,000,000) with a concentration of 5 weight % were mixed at a polymer weight ratio of PVA:PSSNa=90:10, and the mixed solution was stirred until the entire solution became uniform, to prepare a cast solution for producing a precursor membrane.

Next, the cast solution obtained in the above-described manner was applied at a cast thickness of 1500 μm onto a flat substrate the surface of which was coated with Teflon (registered trademark), and the coating membrane was dried at room temperature for 2 days and further dried at 60° C. for 2 hours, to obtain a precursor membrane.

Next, the obtained precursor membrane was subjected to a heat treatment (120° C., 30 minutes), and thereafter, the heat-treated membrane was immersed in a glutaraldehyde solution (the solvent was acetone and the solution contained sulfuric acid with a concentration of 0.1 weight %) with a concentration of 10 weight % at room temperature for 8 hours, so that a crosslinking treatment was performed. Subsequently, the membrane subjected to the crosslinking treatment was washed with ion exchanged water to remove the glutaraldehyde solution, and thereafter, the membrane was immersed in a sulfuric acid aqueous solution having a concentration of 0.5 mole/L at room temperature for 12 hours, to change the PSSNa in the membrane into a polystyrene sulfonic acid (PSS) which is of a proton type. Finally, the membrane immersed in the sulfuric acid aqueous solution was washed with ion exchanged water to remove the sulfuric acid, and thereafter vacuum-dried at room temperature for 12 hours. Thus, an electrolyte membrane using a crosslinked PVA as the base material and containing PSS as the water-soluble polymer electrolyte was obtained.

Example 2

An electrolyte membrane using a crosslinked PVA as the base material and containing PSS as a water-soluble polymer electrolyte was obtained in the same manner as described in Example 1, except that the aqueous solution of PVA and the aqueous solution of PSSNa were mixed at a polymer weight ratio of PVA:PSSNa=80:20.

Example 3

An electrolyte membrane using a crosslinked PVA as the base material and containing PSS as a water-soluble polymer electrolyte was obtained in the same manner as described in Example 1, except that the aqueous solution of PVA and the aqueous solution of PSSNa were mixed at a polymer weight ratio of PVA:PSSNa=70:30.

Comparative Example 1

A precursor membrane obtained in the same manner as described in Example 1 was subjected to a heat treatment (120° C., 30 minutes), and thereafter, the heat-treated membrane was immersed, in a sulfuric acid aqueous solution with a concentration of 0.5 mole/L at room temperature for 12 hours, to change the PSSNa in the membrane into PSS, which is of a proton type. Next, the membrane immersed in the sulfuric acid aqueous solution was washed with ion exchanged water to remove the sulfuric acid, and thereafter vacuum-dried at room temperature for 12 hours. Thus, an electrolyte membrane using PVA as the base material and containing PSS as the water-soluble polymer electrolyte was obtained.

Comparative Example 2

An electrolyte membrane using PVA as the base material and containing PSS as a water-soluble polymer electrolyte was obtained in the same manner as described in Comparative Example 1, except that the aqueous solution of PVA and the aqueous solution of PSSNa were mixed at a polymer weight ratio of PVA:PSSNa=80:20.

Comparative Example 3

An electrolyte membrane using PVA as the base material and containing PSS as a water-soluble polymer electrolyte was obtained in the same manner as described in Comparative Example 1, except that the aqueous solution of PVA and the aqueous solution of PSSNa were mixed at a polymer weight ratio of PVA:PSSNa=70:30.

Comparative Example 4

An aqueous solution of PVA (degree of polymerization: 3,500) with a concentration of 5 weight %, an aqueous solution of sodium polystyrene sulfonate (PSSNa, weight-average molecular weight of 1,000,000) with a concentration of 5 weight %, and an aqueous solution of PEG (weight-average molecular weight of 400) with a concentration of 7.5 weight % were mixed at a polymer weight ratio of PVA:PSSNa: PEG=40:40:20, and the mixed solution was stirred until the entire solution became uniform, to prepare a cast solution for producing a precursor membrane.

Next, the cast solution obtained in the above-described manner was applied at a cast thickness of 1500 μm onto a flat substrate the surface of which was coated with Teflon (registered trademark), and the coating membrane was dried at room temperature for 2 days and further dried at 60° C. for 2 hours, to obtain a precursor membrane.

Next, the obtained precursor membrane was subjected to a heat treatment (120° C., 30 minutes), and thereafter, the heat-treated membrane was immersed in a glutaraldehyde solution (the solvent was acetone and the solution contained sulfuric acid with a concentration of 0.1 weight %) with a concentration of 10 weight % at room temperature for 8 hours, so that a crosslinking treatment was performed. Subsequently, the membrane subjected to the crosslinking treatment was washed with ion exchanged water to remove the glutaraldehyde solution, and thereafter, the membrane was immersed in a sulfuric acid aqueous solution having a concentration of 0.5 mole/L at room temperature for 12 hours, to change the PSSNa in the membrane into PSS, which is of a proton type. Finally, the membrane immersed in the sulfuric acid aqueous solution was washed with ion exchanged water to remove the sulfuric acid, and thereafter vacuum-dried at room temperature for 12 hours. Thus, an electrolyte membrane using PVA as the base material and containing PSS as the water-soluble polymer electrolyte was obtained.

Comparative Example 5

A precursor membrane obtained in the same manner as described in Comparative Example 4 was immersed in a glutaraldehyde solution (the solvent was acetone and the solution contained sulfuric acid with a concentration of 0.01 weight %) with a concentration of 10 weight % at room temperature for 8 hours, so that a crosslinking treatment was performed without conducting a heat treatment. Subsequently, the membrane subjected to the crosslinking treatment was washed with ion exchanged water to remove the glutaraldehyde solution, and thereafter, the membrane was immersed in a sulfuric acid aqueous solution having a concentration of 0.5 mole/L at room temperature for 12 hours, to change the PSSNa in the membrane into PSS, which is of a proton type. Finally, the membrane immersed in the sulfuric acid aqueous solution was washed with ion exchanged water to remove the sulfuric acid, and thereafter vacuum-dried at room temperature for 12 hours. Thus, an electrolyte membrane using PVA as the base material and containing PSS as the water-soluble polymer electrolyte was obtained.

The results of the evaluations of ion exchange capacity, proton conductivity, and methanol cross-over for Examples 1 to 3 and Comparative Examples 1 to 5 are shown in Table 1 below. Table 1 also shows the results of the evaluations of the just-mentioned characteristics for an electrolyte membrane made of Nafion 115 (made by DuPont Corp.), which is a perfluorocarbon sulfonic acid (the shape of which is the same as the electrolyte membranes of the examples and the comparative examples). The characteristics were evaluated in the same manner as used for the samples of the examples and the comparative examples.

Table 1 shows that the methanol cross-over was not determined for Comparative Examples 1 to 5. However, Comparative Examples 1 to 5 showed about the same degree of swelling for the methanol aqueous solution as that of an uncrosslinked PVA membrane, so it is believed that they have very high methanol cross-overs, as high as that of the uncrosslinked PVA membrane.

As shown in Table 1, Examples 1 to 3 had greater ion exchange capacities and exhibited higher proton conductivities than Comparative Examples 1 to 5. In particular, Example 3 exhibited a high proton conductivity comparable to that of the electrolyte membrane made of Nafion 115.

Moreover, Examples 1 to 3 had improved methanol blocking properties over Comparative Examples 1 to 5, which are believed to have very high methanol cross-overs comparable to the uncrosslinked PVA membrane. In particular, Examples 2 and 3 exhibited even better methanol blocking properties than the electrolyte membrane made of Nafion 115.

Comparative Example 6

An electrolyte membrane was prepared in the same manner as described in Example 1, except that the order of the heat treatment and the crosslinking treatment performed for the precursor membrane was reversed.

An attempt was made to evaluate the ion exchange capacity, the proton conductivity, and the methanol cross-over of the produced electrolyte membrane. However, the strength of the membrane obtained was extremely poor, so the evaluation could not be performed. The reason is believed to be that the water resistance of the PVA was not improved sufficiently because the crystallization of the PVA was inhibited by the crosslinking points in the crosslinking treatment. Moreover, it showed macro-phase separation between the PVA and the water-soluble polymer electrolyte, and an increase in non-uniformity of the membrane structure due to this phase separation is also believed to be a cause of the significantly lower strength of the obtained membrane.

Comparative Example 7

An electrolyte membrane was prepared in the same manner as described in Example 1, except that the heat treatment was not performed for the precursor membrane.

An attempt was made to evaluate the ion exchange capacity, the proton conductivity, and the methanol cross-over of the produced electrolyte membrane. However, the strength of the membrane obtained was extremely poor, so the evaluation could not be performed.

TABLE 1

|  | Polymer blend ratio (weight ratio) | Heat treatment | Crosslinking treatment | Ion exchange capacity (meq/g) | Proton conductivity (S/cm) | Methanol cross-over (mmol/hr/cm) |
|---|---|---|---|---|---|---|
| Ex. 1 | PVA:PSSNa = 90:10 | Performed | Performed | 0.37 | $7.4 \times 10^{-3}$ | 0.093 |
| Ex. 2 | PVA:PSSNa = 80:20 | Performed | Performed | 0.86 | $22.7 \times 10^{-3}$ | 0.033 |
| Ex. 3 | PVA:PSSNa = 70:30 | Performed | Performed | 1.27 | $40.6 \times 10^{-3}$ | 0.026 |
| Comp. Ex. 1 | PVA:PSSNa = 90:10 | Performed | Not performed | 0.14 | $3.6 \times 10^{-3}$ | Not measured |
| Comp. Ex. 2 | PVA:PSSNa = 80:20 | Performed | Not performed | 0.11 | $2.6 \times 10^{-3}$ | Not measured |
| Comp. Ex. 3 | PVA:PSSNa = 70:30 | Performed | Not performed | 0.12 | $2.9 \times 10^{-3}$ | Not measured |
| Comp. Ex. 4 | PVA:PSSNa:PEG = 40:40:20 | Performed | Performed | 0.11 | $1.2 \times 10^{-3}$ | Not measured |
| Comp. Ex. 5 | PVA:PSSNa:PEG = 40:40:20 | Not performed | Performed | 0.12 | $0.7 \times 10^{-3}$ | Not measured |
| Nafion 115 | — | — | — | 0.92 | $56.2 \times 10^{-3}$ | 0.054 |

Example 4

Using the electrolyte membrane of Example 1, a fuel cell was fabricated, and the power generation characteristics thereof were evaluated.

The electrolyte membrane of Example 1 (thickness: 60 µm) was cut out into a size of 45 mm×45 mm and kept for under an atmosphere with a temperature of 70° C. and a relative humidity of 100% until it reached an equilibrium state with the atmosphere. Next, the electrolyte membrane that had been kept for was sandwiched by a pair of gaskets (which were made of PTFE showing a less variation in thickness due to pressure application and had the same shape) each having a rectangular window portion (23 mm×23 mm). Thereafter, an anode electrode was fitted into one of the window portions and a cathode electrode was fitted into the other one of the window portions so that the electrodes are in contact with the electrolyte membrane. The electrode used for both electrodes was a gas diffusion electrode in which a catalyst layer made of a mixture of a supported platinum catalyst (TEC66E50 for the anode and TEC10E50E for the cathode, both made by Tanaka Kikinzoku Kogyo, the amount of supported platinum was 4.0 mg/cm² for both) and a perfluorocarbon sulfonic acid (Nafion DE-520, made by DuPont Corp.) was formed on a carbon paper (TGP-H-060 made by Toray Industries, Inc.). Next, a stack assembly of the electrolyte membrane, the electrodes, and the gaskets was sandwiched by a pair of carbon separators in which grooves serving as the flow passages of the fuel or the oxidizing agent were formed in the surface, and pressure was applied to each of the components in the stacking direction, whereby a cell for evaluating the power generation characteristics was formed. The cell area was 5.3 cm², the same as the area of the window portion of the gasket. The stack assembly was sandwiched by the carbon separators in such a manner that the grooves in the separators were in contact with the electrodes. The pressure applied was set to such a pressure that the fuel does not leak from the gaps between the separators and the gaskets.

Figure 3:
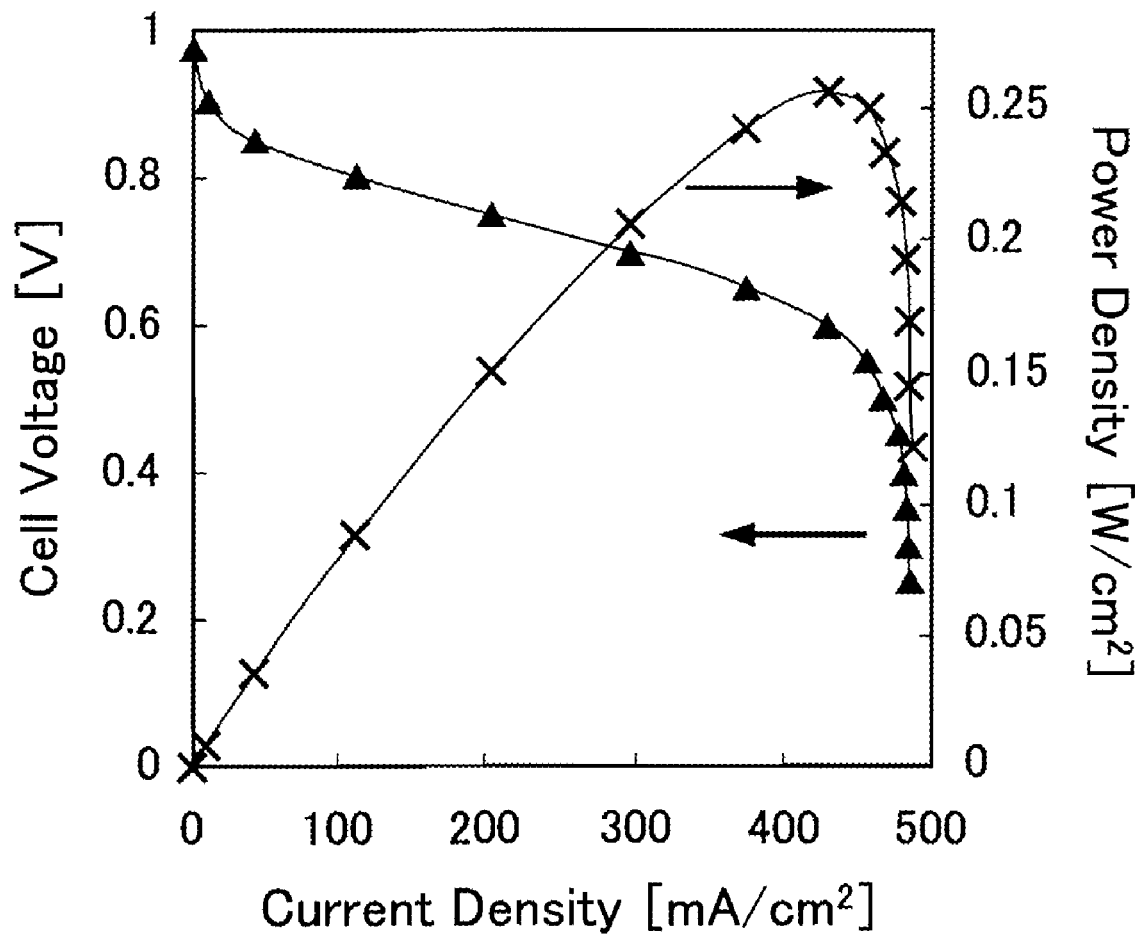
FIG. 3 is a graph illustrating the power generation characteristics of a fuel cell (the fuel of which is hydrogen) fabricated in Examples.

Fuel and an oxidizing agent were supplied to the evaluation cell thus prepared, and the I-V characteristics (current-voltage characteristics) thereof were evaluated using a known method. The results of the evaluation are shown in FIG. 3. The conditions for evaluating the I-V characteristics were as follows: Cell temperature: 70° C.; Fuel: pure hydrogen, dew point 70° C., flow rate 1.5 mL/min.; Oxidizing agent: air, dew point 70° C., flow rate 250 mL/min.

As shown in FIG. 3, an open circuit voltage (OCV) of 978 mV and a maximum power density $W_{max}$ of 256.5 mW/cm² (when the current density was 427 mA/cm²) were achieved with the evaluation cell prepared in the above-described manner.

Figure 4:
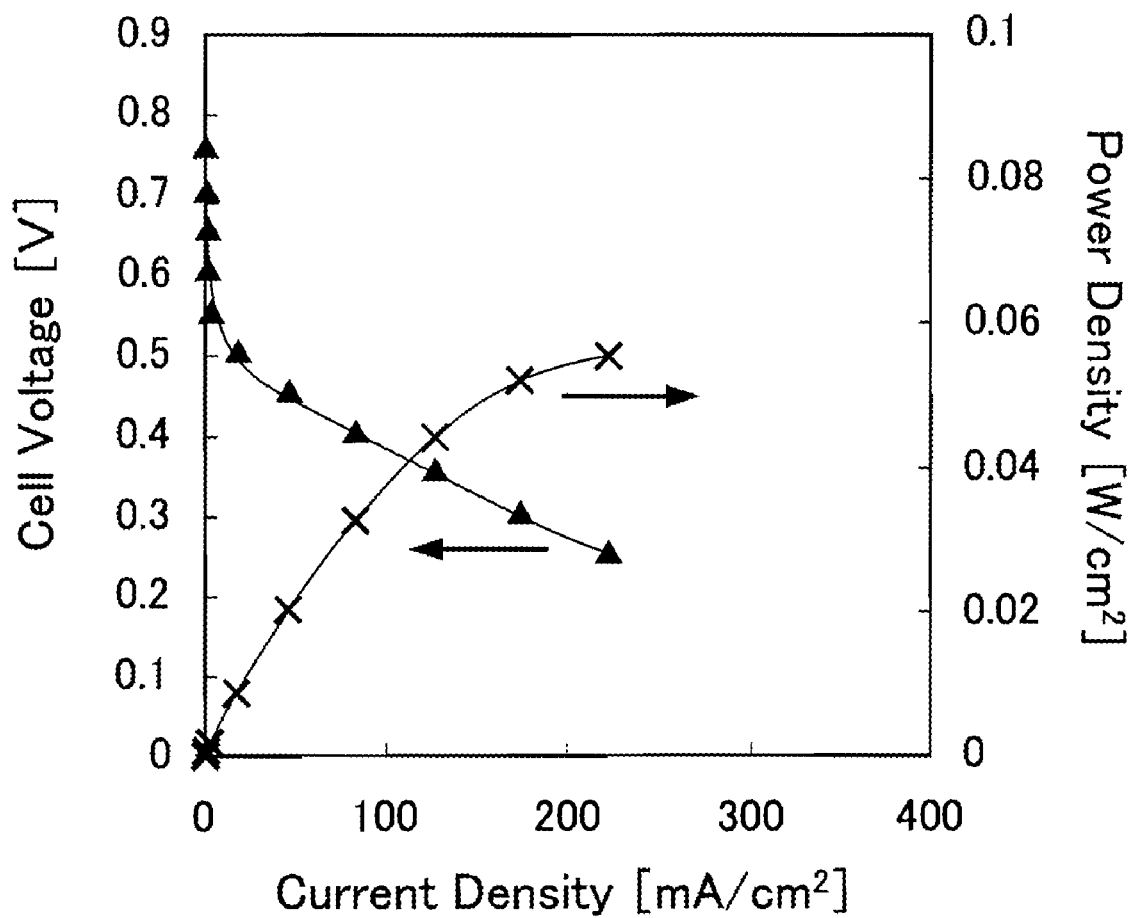
FIG. 4 is a graph illustrating the power generation characteristics of a fuel cell (the fuel of which is a methanol aqueous solution) fabricated in Examples.

In addition, a methanol aqueous solution was supplied to another evaluation cell prepared in the above-described manner, and the I-V characteristics thereof were evaluated. The results of the evaluation are shown in FIG. 4. The conditions for evaluating the I-V characteristics were as follows: Cell temperature: 70° C.; Fuel: methanol aqueous, solution with a concentration of 1 mole/L, flow rate 1.5 mL/min.; Oxidizing agent: dry air, flow rate: 250 mL/min.

As shown in FIG. 4, in the case where a methanol aqueous solution was supplied for the fuel, an OCV of 753 mV (when the current density was 183 mA/cm²) and a maximum power density $W_{MAX}$ of 55.0 mW/cm² were achieved.

A paper by Qiao et al. (Jinli Qiao et al., "Life test of DMFC using poly(ethylene glycol)bis(carboxymethyl)ether plasticized PVA/PAMPS proton-conducting semi-IPNs", Electrochemistry Communications, Vol. 9, Issue 8, August 2007, pp. 1945-1950) reports that a maximum power density of 51 mW/cm² was obtained when an adhesive layer made of a proton-conductive ionomer was disposed between the electrolyte membrane and the electrodes (the fuel was a methanol aqueous solution). Although a simple comparison cannot be made because the configurations of the cells and the power generation conditions are different, it was found that the electrolyte membrane of Example 1 can yield the power generation characteristics equivalent to or even better than the electrolyte membrane disclosed in the paper, even without such an adhesive layer having the function to improve power generation characteristics.

The present invention is applicable to various other embodiments unless they depart from the intentions and the essential features of the invention. The embodiments disclosed herein are purely illustrative and not in any sense limiting. The scope of the invention is defined by the appended claims, not by the description, and all the modifications and equivalents to the claims are intended to be included within the scope of the invention.

INDUSTRIAL APPLICABILITY

The electrolyte membrane manufactured according to the method of the present invention can be used suitably for a PEFC (in particular for a DMFC, which uses a methanol-containing solution as a fuel). It can improve the power generation efficiency of the PEFC and moreover makes it possible to achieve a low-cost PEFC by using PVA as the base material of the electrolyte membrane.

The invention claimed is:

1. A method of manufacturing a proton-conductive polymer electrolyte membrane, comprising:
   heat-treating a precursor membrane comprising polyvinyl alcohol (PVA) and a water-soluble polymer electrolyte having a proton conductive group to proceed crystallization of the PVA; and
   chemically crosslinking the heat-treated precursor membrane with a crosslinking agent reactive with the PVA, to form a polymer electrolyte membrane in which a crosslinked PVA is a base material and protons are conducted through the electrolyte retained in the base material,
   wherein the content of a water-soluble polymer except the PVA and the water-soluble polymer electrolyte in the precursor membrane is in a weight ratio of less than 0.1 with respect to the PVA.

2. The method of manufacturing a proton-conductive polymer electrolyte membrane according to claim 1, wherein the proton conductive group is a sulfonic acid group or a phosphoric acid group.

3. The method of manufacturing a proton-conductive polymer electrolyte membrane according to claim 1, wherein the water-soluble polymer electrolyte is at least one selected from the group consisting of polystyrene sulfonic acid, polyvinyl sulfonic acid, poly(2-acrylamide-2-methylpropanesulfonic acid), sulfonated poly(ether ether ketone), and sulfonated poly(ether sulfone).

4. The method of manufacturing a proton-conductive polymer electrolyte membrane according to claim 1, wherein the content of the water-soluble polymer electrolyte in the precursor membrane is in a weight ratio of from 0.05 to 1 with respect to the PVA.

5. A proton-conductive polymer electrolyte membrane obtained by the method according to claim 1.

6. A membrane-electrode assembly comprising:
a polymer electrolyte membrane, and a pair of electrodes disposed so as to sandwich the electrolyte membrane, wherein
the electrolyte membrane is a proton-conductive polymer electrolyte membrane according to claim 5.

7. A polymer electrolyte fuel cell comprising:
a polymer electrolyte membrane;
a pair of electrodes disposed so as to sandwich the electrolyte membrane; and
a pair of separators disposed so as to sandwich the pair of electrodes, wherein
the electrolyte membrane is a proton-conductive polymer electrolyte membrane according to claim 5.

8. The polymer electrolyte fuel cell according to claim 7, being a direct methanol fuel cell.

9. A proton-conductive polymer electrolyte membrane comprising:
a base material comprising a crosslinked polyvinyl alcohol (PVA); and a proton-conductive water-soluble polymer electrolyte retained in the base material, wherein
the content of a water-soluble polymer except the PVA and the water-soluble polymer electrolyte is in a weight ratio of less than 0.1 with respect to the PVA.

10. A membrane-electrode assembly comprising:
a polymer electrolyte membrane, and a pair of electrodes disposed so as to sandwich the electrolyte membrane, wherein
the electrolyte membrane is a proton-conductive polymer electrolyte membrane according to claim 9.

11. A polymer electrolyte fuel cell comprising:
a polymer electrolyte membrane;
a pair of electrodes disposed so as to sandwich the electrolyte membrane; and
a pair of separators disposed so as to sandwich the pair of electrodes, wherein
the electrolyte membrane is a proton-conductive polymer electrolyte membrane according to claim 9.

12. The polymer electrolyte fuel cell according to claim 11, being a direct methanol fuel cell.

* * * * *